(12) United States Patent
Thomas et al.

(10) Patent No.: US 9,392,471 B1
(45) Date of Patent: Jul. 12, 2016

(54) SELF-OPTIMIZING NETWORK (SON) SYSTEM FOR MOBILE NETWORKS

(71) Applicant: Viavi Solutions UK Limited, Berkshire (GB)

(72) Inventors: Howard John Thomas, Stonehouse (GB); Mihai Stanciuc, Bershire (GB); David Charles Padfield, Wiltshire (GB); Robert Edward Trybulec, Berkshire (GB); Peter Randall, Abingdon (GB)

(73) Assignee: Viavi Solutions UK Limited, Berkshire (GB)

( * ) Notice: Subject to any disclaimer, the term of this patent is extended or adjusted under 35 U.S.C. 154(b) by 0 days.

(21) Appl. No.: 14/808,619

(22) Filed: Jul. 24, 2015

(51) Int. Cl.
*H04W 24/02* (2009.01)
*H04W 36/00* (2009.01)
*H04L 12/24* (2006.01)
*H04W 84/18* (2009.01)

(52) U.S. Cl.
CPC .............. *H04W 24/02* (2013.01); *H04L 41/12* (2013.01); *H04W 36/0061* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 8,045,531 B2* | 10/2011 | Cheng | .................. | H04W 8/005 370/252 |
| 8,073,444 B2* | 12/2011 | Riley | .................. | H04L 41/0893 370/338 |
| 8,175,236 B2* | 5/2012 | Pandey | .............. | G06Q 30/0267 370/329 |
| 8,583,110 B2* | 11/2013 | Riley | .................. | H04L 41/0893 370/329 |
| 9,020,191 B2* | 4/2015 | Gupta | .................. | G06K 9/6202 382/103 |
| 2003/0109270 A1* | 6/2003 | Shorty | ................ | H04L 12/2803 455/517 |
| 2006/0187817 A1* | 8/2006 | Charzinski | .......... | H04L 12/5695 370/216 |
| 2008/0069001 A1* | 3/2008 | Aschauer | ............ | H04L 67/1051 370/238 |
| 2012/0072762 A1* | 3/2012 | Atchison | ............... | G06F 9/5072 714/2 |
| 2013/0103822 A1* | 4/2013 | Wolcott | .................. | H04L 41/12 709/224 |
| 2014/0096134 A1* | 4/2014 | Barak | ................. | G06F 9/45558 718/1 |

* cited by examiner

*Primary Examiner* — Ashish K Thomas
(74) *Attorney, Agent, or Firm* — Hannity & Hannity, LLP

(57) ABSTRACT

A device receives subscriber records for mobile devices associated with a mobile network, and receives performance data associated with the mobile network in near real time. The performance data includes one or more of performance management statistics, call trace data associated with the subscriber records, and geolocated subscriber records for the mobile devices. The device stores the geolocated subscriber records with other types of data in an asynchronous manner, and receives configuration data associated with the mobile network and indicating a topology of the mobile network. The device identifies, based on at least one of the topology and the performance data, a desired topology of the mobile network. The desired topology is predicted to achieve at least one of improved network performance or alignment with a network design policy.

20 Claims, 17 Drawing Sheets

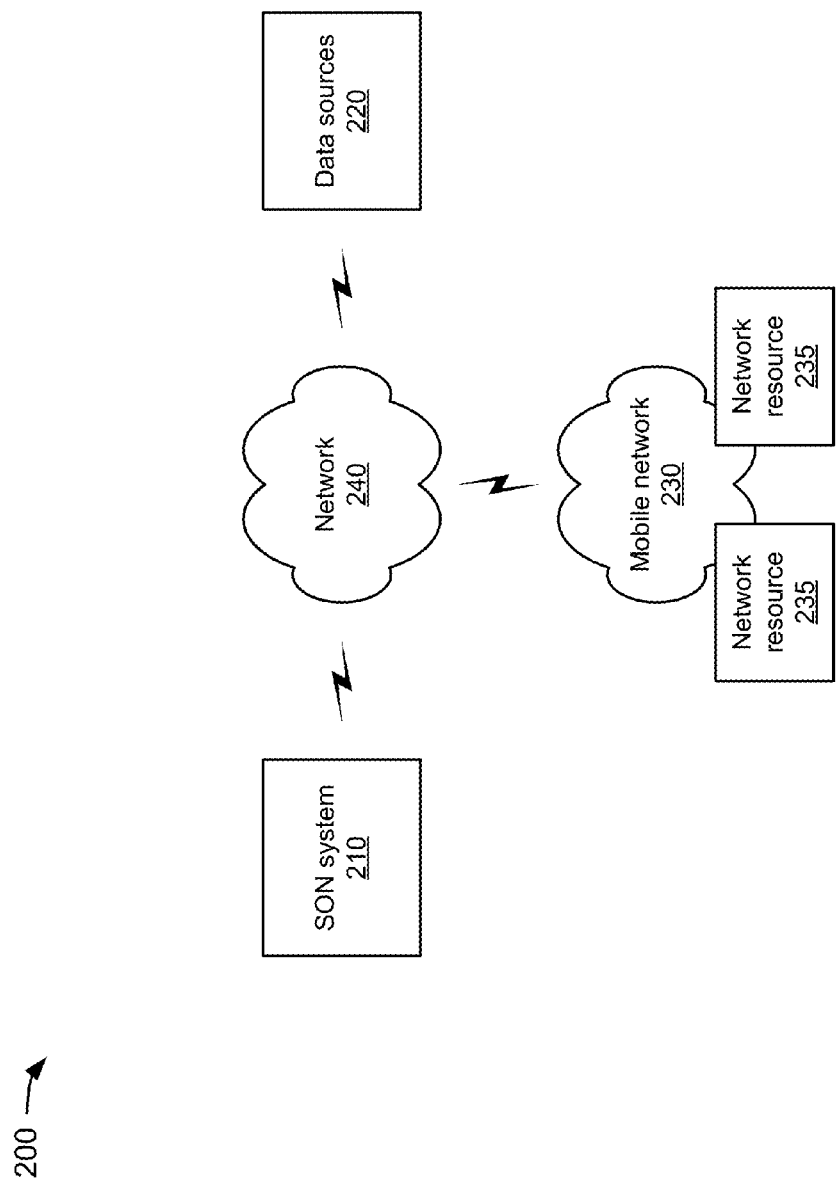

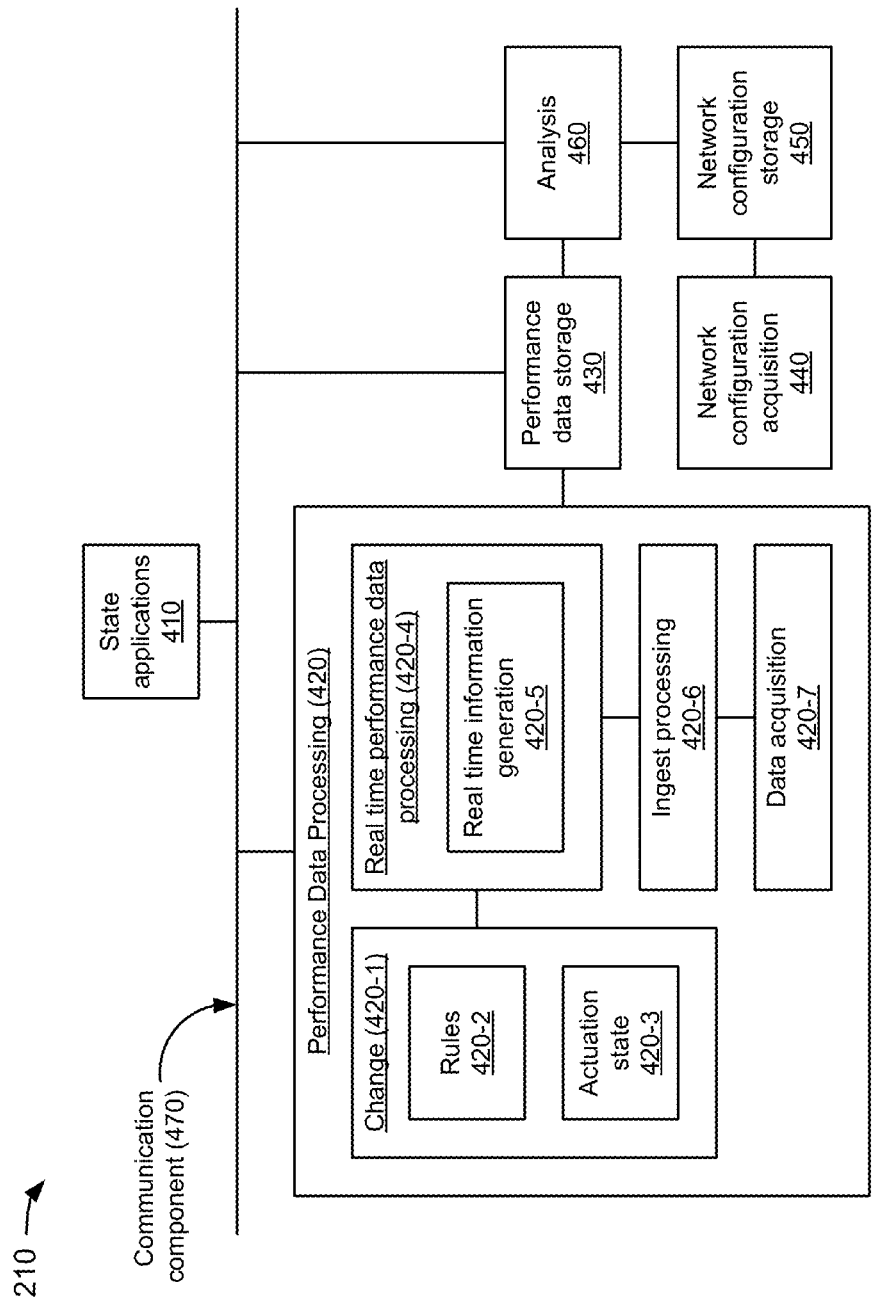

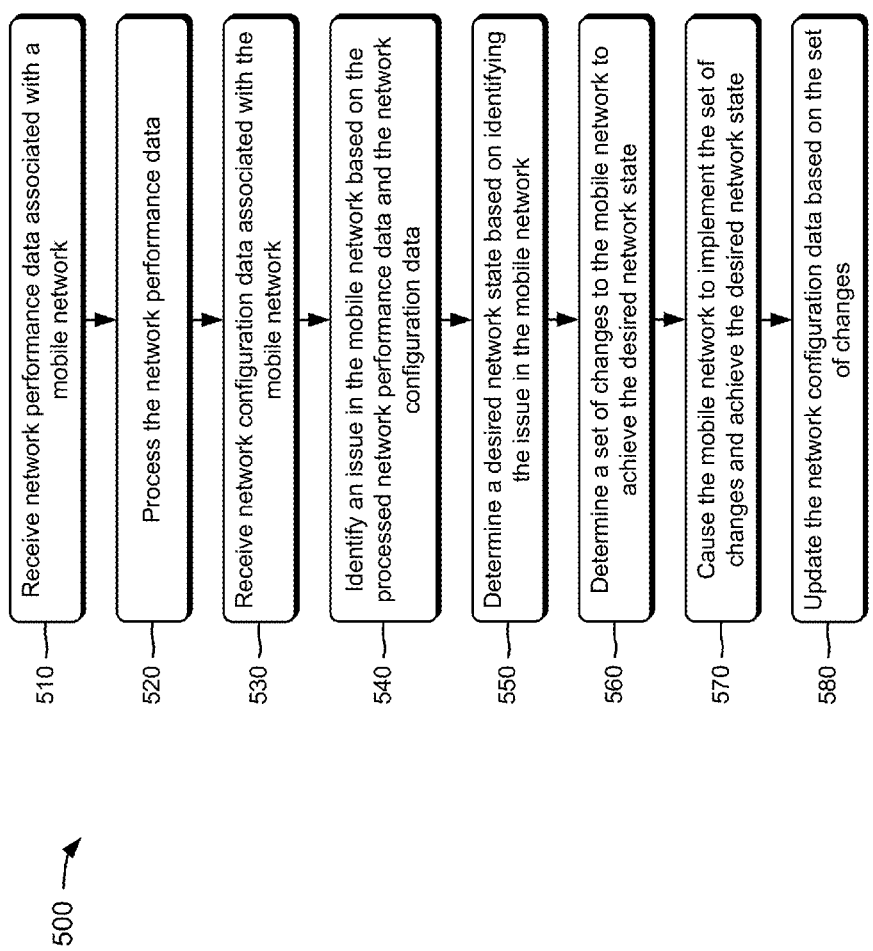

| Target Cell ID (TCI) | Whitelist | Blacklist |
|---|---|---|
| TCI #1 | | ✓ |
| TCI #2 | ✓ | |
| TCI #3 | ✓ | |
| TCI #4 | ✓ | |
| ... | | |

FIG. 8C

| Neighbor cell relation (840) | Target Cell ID (TCI) (820) | Attributes (845) |
|---|---|---|
| 1 | TCI #2 | On whitelist |
| 2 | TCI #3 | On whitelist |
| 3 | TCI #4 | On whitelist |
| 4 | TCI #5 | Measurement reports |
| 5 | TCI #7 | Measurement reports |
| 6 | TCI #9 | Measurement reports |
| 7 | TCI #10 | Measurement reports |

Neighbor cell relation (NCR) list (835)

First portion (850): rows 1–3
Second portion (855): rows 4–7

SELF-OPTIMIZING NETWORK (SON) SYSTEM FOR MOBILE NETWORKS

BACKGROUND

Mobile communication devices, such as smart phones, tablet computers, laptop computers, and other electronic handheld devices, are becoming increasingly popular. In order to support the growing number of mobile communications devices, mobile networks (e.g., third generation (3G) and fourth generation (4G) cellular networks) employ radio network subsystems with macro cells using one or more high-powered base stations. Although advances in technology have made it possible for these base stations to cover relatively large geographical areas to improve mobile communications, this is a one-size-fits-all approach that may not adequately leverage network resources to fully optimize a mobile network for mobile communications.

With the advent of fifth generation (5G) systems that further develop the technology of network-function virtualization (NFV) and software-defined networking (SDN), the concept of delivering network infrastructure as a service (NaaS) is being introduced. Such networks may support multi-tenancy and may include an infrastructure that supports multiple operators of different types. Consequently, an individual operator's scope of control may be constrained to one or more portions or "slices" of the network infrastructure subject to an agreement with the infrastructure owner to receive the NaaS. Therefore, different users for a self-optimizing network (SON) may target one or more individual slices of the network, where each network slice may include a different set of network functions.

BRIEF DESCRIPTION OF THE DRAWINGS

FIG. 2 is a diagram of an example environment in which systems and/or methods, described herein, may be implemented;

FIG. 4 is a diagram of example functional components of a self-optimizing network (SON) system depicted in FIG. 2;

FIG. 5 is a flow chart of an example process for automatically optimizing a network configuration state of a mobile network;

FIGS. 8A-8F are diagrams of an example relating to the example process shown in FIG. 7.

DETAILED DESCRIPTION

Figure 1A:
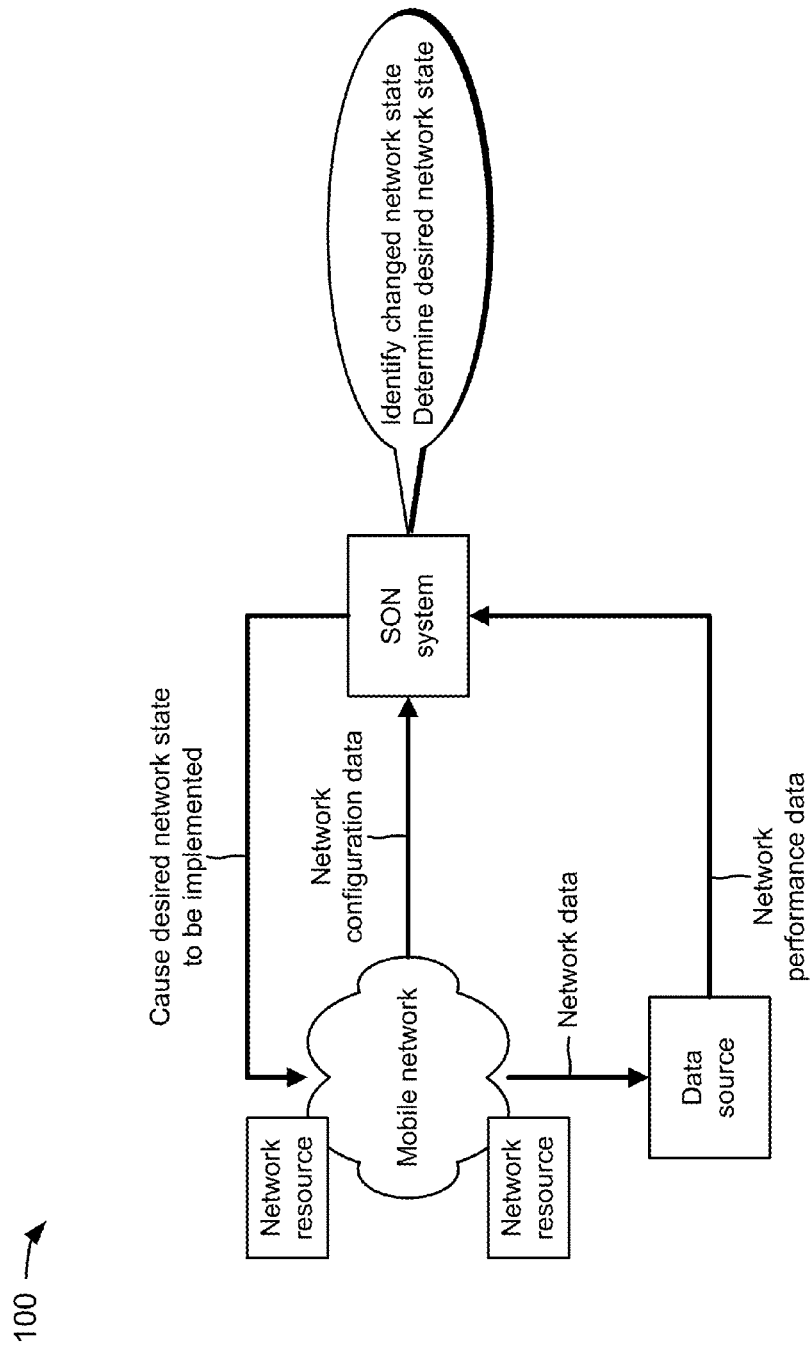
FIGS. 1A and 1B are diagrams of an overview of an example implementation described herein.

The following detailed description refers to the accompanying drawings. The same reference numbers in different drawings may identify the same or similar elements.

For instance, current mobile networks fail to fully utilize detailed knowledge of users, the users' mobile communication devices, and other specific information to better allocate network resources in order to implement a more efficient, focused, and customized network plan. A self-organizing or self-optimizing network (SON) system may utilize various mechanisms to determine whether a mobile network is performing optimally for a given set of traffic conditions. A base station of a mobile network may contain configuration parameters that control various aspects of a cell site of the mobile network. The SON system may alter each of these parameters to change network behavior, based on observations of the base station, measurements at a mobile communication device, or other acquired data. For example, the SON system may automatically alter various network parameters if such changes would lead to a better user experience for some or all users. The network parameters may include transmit power levels, neighbor cell relation tables, antenna electrical tilts, antenna pointing direction/angles (e.g., elevation and/or azimuth), and handover thresholds (e.g., a mobile communication device of a voice user on a heavily-used 4G network may be encouraged to perform a handover to a base station of another network in order to free up 4G resources).

The SON system may make changes to network configuration data in order to improve mobile network performance. For example, the SON system may adjust the network configuration data to alter cell sizes, to balance a load across the mobile network, to improve overall mobile network capacity, to improve overall mobile network coverage, or the like. In other words, the SON system may not account for current traffic existing in the mobile network at a given point in time or for individual locations or trajectories of mobile communication devices. Without using specific information related to current traffic conditions, geo-location, or geo-location-derived information from the mobile communication devices, poorer and much slower network optimization decisions may be made by the SON system. Furthermore, the SON system may need to freeze the state of the network before and after a configuration change or potentially even to disable the entire mobile network in order to implement changes to the mobile network.

A mobile network needs a list or a table of neighbor cells to which the mobile network performs a handover of mobile communication devices. Such a list may be referred to as a neighbor cell relation list or a neighbor relation list. Manually provisioning and managing neighbor cells associated with a mobile network is a challenging task. Thus, a base station of a mobile network may utilize an automatic neighbor relation (ANR) functionality to provision and manage neighbor cell relations via a neighbor cell relation list. The ANR functionality may be based on a radio overlap between cells or based on a set cover problem (e.g., given a set of elements, called the universe, and a set S of n sets whose union equals the universe, the set cover problem is to identify the smallest subset of S whose union equals the universe). However, ANR based on the radio overlap between cells is a poor predictor of less frequently used cells, and ANR based on the set cover problem does not reflect usage of cell relationships and is computationally extensive.

Systems and/or methods, described herein, may provide a self-optimizing network (SON) system that performs optimization of a mobile network, such as a cellular network. The SON system may include an architecture that allows multiple data types to be stored in an asynchronous manner in a table structure that facilitates processing of data within specific time ranges. The SON system may account for current traffic existing in the mobile network at a given point in time and for individual locations or trajectories of mobile communication devices. The SON system may generate an optimized neighbor cell relation list for a cell in a mobile network, such as a cellular network. The systems and/or methods may determine, analyze, and implement changes to network parameters (e.g., neighbor cell relation lists, transmit power levels, antenna electrical tilts, antenna pointing direction/angles, or the like) in a mobile network very quickly (e.g., within seconds or a few minutes) using the SON system. With the increased speeds associated with implementing the changes in near real-time (i.e., real-time or substantially real-time), the mobile network may not need to be frozen to determine and assess a configuration change, and may not need to be disabled for the changes to be implemented.

Figure 1B:
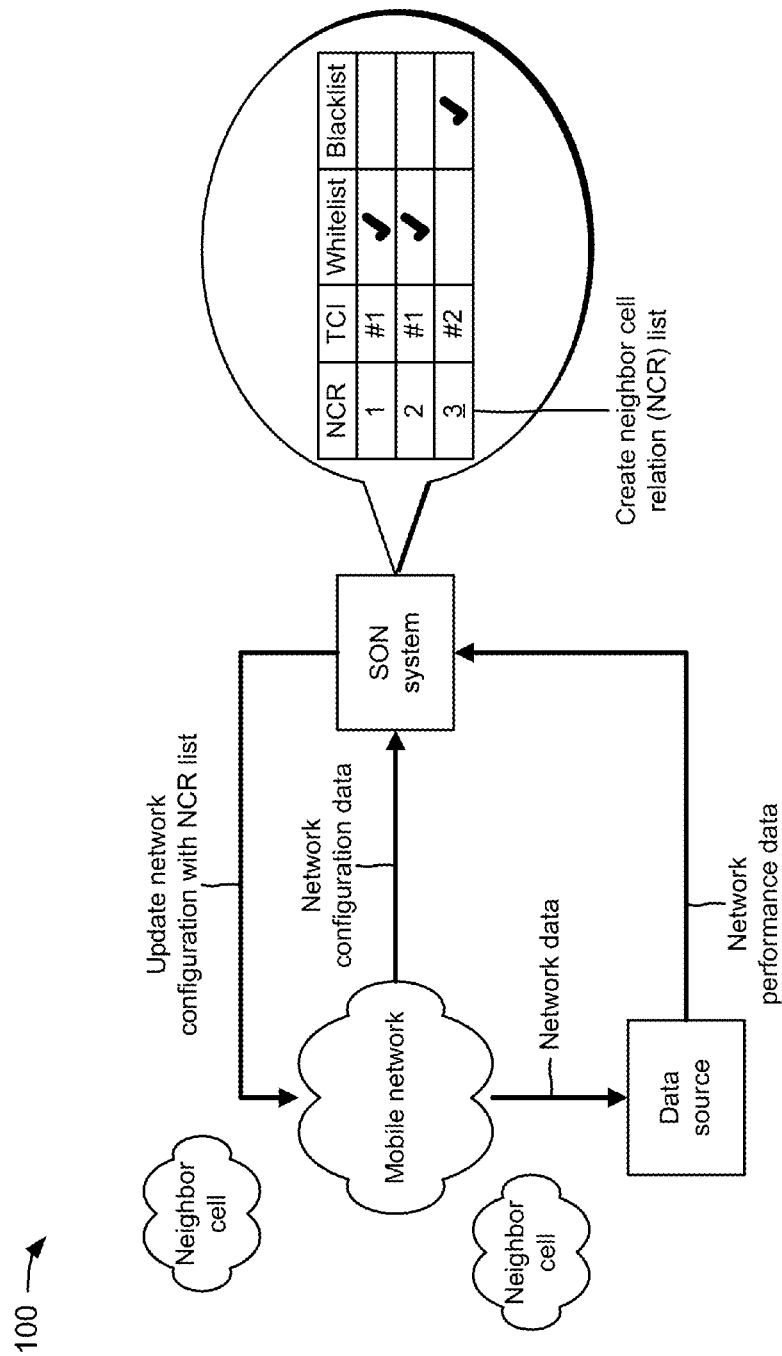

FIGS. 1A and 1B are diagrams of an overview of an example implementation 100 described herein. As shown in FIG. 1A, a SON system and a data source may communicate with a mobile network, such as a cellular network. The mobile network may include multiple network resources, such as a base station, a receiver antenna, a mobility management entity (MME), an operations support system (OSS), or the like. The data source may include a device that receives network data from probes, measurement instruments, virtual network functions (VNFs), or the like, associated with the mobile network. The network data may include packet data, call data, load information, or the like, associated with the mobile network. The data source may determine network performance data (e.g., throughput, dropped calls, quality of service (QoS), or the like) based on the network data, and may provide the network performance data to the SON system.

As further shown in FIG. 1A, the mobile network may provide network configuration data to the SON system. The network configuration data may include KPIs associated with the mobile network, a number of cells in the mobile network, a number of network resources, a topology of the network resources, provisioning of the network resources, faults and events occurring in the mobile network, network configuration errors, or the like. The SON system may identify an issue in the mobile network based on the network performance data and/or the network configuration data, and may determine a desired network state based on identifying the issue in the mobile network. For example, the issue may include an error in the configuration data. The SON system may cause the mobile network to implement the desired network state. In some implementations, the change in network configuration caused by the SON system may include a notification to investigate system operation and configuration. For example, if an added neighbor cell is not used or results in a dropped call, a root cause may, for example, autonomously be detected as an ambiguity in physical cell identity (PCID) planning.

As shown in FIG. 1B, the mobile network may include multiple neighbor cells to which the mobile network may perform a handover of mobile communication devices. The mobile network may provide the network data to the data source, and the data source may generate the network performance data based on the network data, as described with respect to FIG. 1A. In some implementations, the network performance data may include a frequency of use of the neighbor cells for handovers by the mobile network, measurement reports (e.g., reports, provided by mobile communication devices to the mobile network, that include measurements of the neighbor cells, measurements of block error rates, measurements of transmit powers, or the like), and call completion codes (e.g., completed, hung up, no answer, busy, unobtainable, dropped, failed, or an inference that a call normal release was initiated by one of the parties of the call due to poor user experience on the call). The data source may provide the network performance data to the SON system. The mobile network may provide the network configuration data to the SON system. In some implementations, the network configuration data may include a neighbor cell relation list.

As further shown in FIG. 1B, the SON system may receive the network performance data and the network configuration data, and may create or update a whitelist and a blacklist of neighbor cells based on the call completion codes. For example, the SON system may update the whitelist or the blacklist based on a normal release cause but where other information available to the SON system suggests that the call may have been released due to the perception of poor user experience by one of the parties to the call. The SON system may modify a first portion of the neighbor cell relation list based on the whitelist, the blacklist, and/or the frequency of use of the neighbor cells for handovers, and may modify a second portion of the neighbor cell relation list based on the whitelist, the blacklist, and/or the measurement reports. The SON system may update the network configuration data with the modified neighbor cell relation list, and may provide the updated network configuration data to the mobile network. One or more members of the blacklist may be determined by the SON system based on a relatively poor utilization of the neighbor relation based on a relative or absolute threshold.

Systems and/or methods, described herein, may provide a SON system that performs optimization of a mobile network, such as a cellular network, and that generates an optimized neighbor cell relation list for a cell in the mobile network. The systems and/or methods may determine, analyze, and implement changes to network parameters in the mobile network very quickly using the SON system (e.g., where "quickly" may be based on a factor representing a speed of system optimization and a multi-dimensional complexity of the associated optimization). With the increased speeds associated with implementing the changes in near real-time, the entire mobile network may not need to be disabled for the changes to be implemented.

FIG. 2 is a diagram of an example environment 200 in which systems and/or methods, described herein, may be implemented. As illustrated, environment 200 may include a SON system 210, data sources 220, a mobile network 230 with network resources 235, and a network 240. Devices/networks of environment 200 may connect via wired connections, wireless connections, or a combination of wired and wireless connections.

SON system 210 may include one or more devices capable of receiving, generating, storing, processing, and/or providing information, such as information described herein. For example, SON system 210 may include one or more computing devices, such as one or more server devices, desktop computers, workstation computers, virtual machines (VMs) provided in a cloud computing environment, or similar devices. In some implementations, SON system 210 may be utilized by an entity that manages and/or operates one or more portions of environment 200, such as, for example, a telecommunication service provider, a television service provider, an Internet service provider, or the like.

In some implementations, SON system 210 may include a data structure (e.g., a database, a table, a list, or the like) that permits multiple data types to be stored in an asynchronous manner in a table structure that facilitates processing of data within specific time ranges. The data structure may utilize embedded queries that process data, create new data entries, and make decisions about how to process, locate, correct, move, or the like, the data. For example, raw data and data derived from an aggregation of data gathered over time may be stored concurrently in the data structure.

Data sources 220 may include one or more devices capable of receiving, generating, storing, processing, and/or providing information, such as information described herein. For example, data sources 220 may include one or more computing devices, such as one or more server devices, desktop computers, workstation computers, VMs provided in a cloud computing environment, or similar devices. In some implementations, data sources 220 may be utilized by an entity that manages and/or operates one or more portions of environment 200, such as, for example, a telecommunication service provider, a television service provider, an Internet service provider, or the like.

In some implementations, data sources 220 may include probes, measurement instruments, VNFs, third party performance managers (PMs), or the like, that monitor real time network data and/or network performance data associated with mobile network 230. In implementations related to conceptual architectures being considered for 4G and 5G systems, virtualization may be exploited to the extent that a network infrastructure is provided as a service (NaaS) in a system that constrains individual network operators to one or more "slices" of the actual physical hardware provided by one or more providers. In some implementations, data sources 220 may include one or more devices that receive the real time network data from the probes, the measurement instruments, the VNFs, the third party PMs, or the like, and determine the network performance data (e.g., throughput of mobile network 230, bandwidth of mobile network 230, dropped calls or packets experienced by mobile network 230, or the like) based on the real time network data. In some implementations, data sources 220 may include or be associated with one or more data structures (e.g., databases, lists, trees, tables, or the like) that store the real time network data and/or the network performance data.

Mobile network 230 may include a mobile communications network, such as 3G cellular network, a 4G cellular network, a heterogeneous network, and/or a combination of these or other types of networks. In some implementations, mobile network 230 may correspond to an evolved packet system (EPS) that includes an OSS, a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may include a base station (eNB). The EPC network may include a mobility management entity (MME), a serving gateway (SGW), a policy and charging rules function (PCRF), and a PDN gateway (PGW). The IMS network may include a home subscriber server (HSS), a proxy call session control function (P-CSCF), and a serving call session control function (S-CSCF).

In some implementations, mobile network 230 may include network resources 235, such as, for example, the OSS, the eNB, the MME, the SGW, the PCRF, the PGW, the HSS, the P-CSCF, the S-CSCF, or the like.

Network 240 may include one or more wired and/or wireless networks. For example, network 240 may include a cellular network, a public land mobile network ("PLMN"), a local area network ("LAN"), a wide area network ("WAN"), a metropolitan area network ("MAN"), a telephone network (e.g., the Public Switched Telephone Network ("PSTN")), an ad hoc network, an intranet, the Internet, a fiber optic-based network, a cloud computing network, a private network, and/or a combination of these or other types of networks. In some implementations, network 240 may include one or more device-to-device wireless networks where communication may occur through direct communication between devices, under the control of network 240 or independently. In some implementations, direct device-to-device links may comprise one or more hops. Such direct device-to-device links may be used in a cooperative manner together with point-to-point and/or point-to-multi-point links mediated by network 240.

The number and arrangement of devices and/or networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
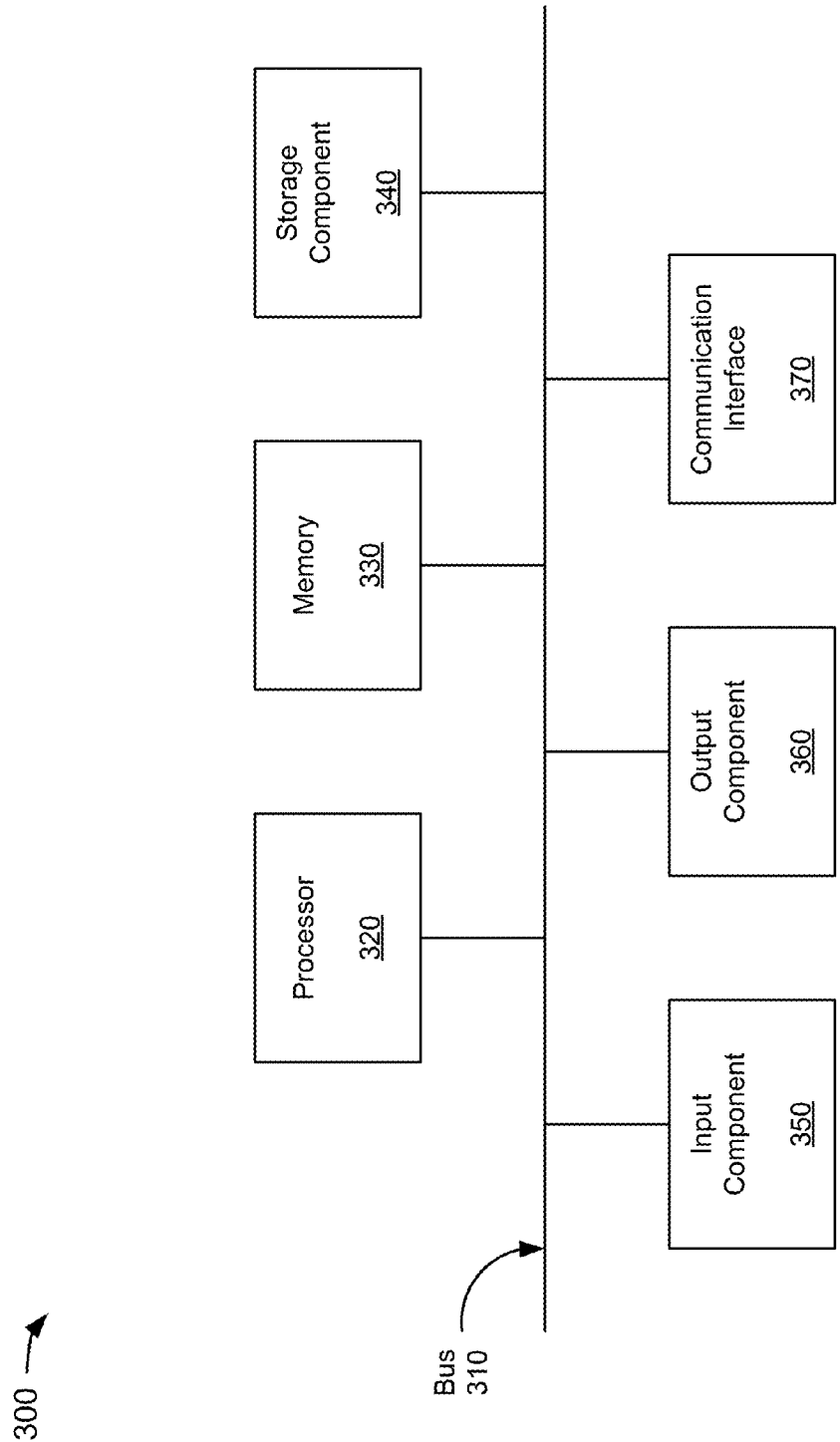
FIG. 3 is a diagram of example components of a device that may correspond to one or more of the devices of the environment depicted in FIG. 2.

FIG. 3 is a diagram of example components of a device 300. Device 300 may correspond to SON system 210, a data source 220, and/or a network resource 235. In some implementations, SON system 210, data source 220, and/or network resource 235 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 is implemented in hardware, firmware, or a combination of hardware and software. In some implementations, processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that can be programmed to perform a function. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIG. 4 is a diagram of example functional components of SON system 210. As shown in FIG. 4, SON system 210 may include a state applications component 410, a performance data processing component 420, performance data storage 430, a network configuration acquisition component 440, network configuration storage 450, an analysis component 460 and a communication component 470. Performance data processing component 420 may include a change component 420-1 with a rules component 420-2 and an actuation state component 420-3; a real time performance data processing component 420-4 with a real time information generation component 420-5; an ingest processing component 420-6; and a data acquisition component 420-7.

State applications component 410 may store state information associated with applications executed by SON system 210. In some implementations, state applications component 410 may store state information associated with functions performed by SON system 210, as described herein. In some implementations, state applications component 410 may cause mobile network 230 to implement changes based on information received from other components of SON system 210. In some implementations, one or more functions of SON system 210 may be distributed and operate on network elements under a distributed control system. In some implementations, the one or more functions of SON system 210 may operate in a centralized manner. In such implementations, the one or more functions of SON system 210 may be determined by a centralized controlling node, may operate in a hybrid manner, or the like.

Performance data processing component 420 may receive network performance data (e.g., throughput, dropped calls, quality of service (QoS), or the like) from data sources 220 and/or mobile network 230, and cause mobile network 230 to implement changes to one or more network parameters based on the network performance data. For example, change component 420-1 may configure functions of mobile network 230, such as functions performed by an OSS of mobile network 230, allocating capacity for network function virtualization and/or data links per a policy provided by a PCRF of mobile network 230, or the like. Rules component 420-2 may generate a distributed set of rules (e.g., network parameters) that may be used to cause mobile network 230 to implement the functions. Actuation state component 420-3 may communicate with mobile network 230 (e.g., with the OSS of mobile network 230) to cause mobile network 230 to implement the set of network parameters generated by rules component 420-2.

Performance data processing component 420 may receive network performance data from data sources 220 and/or mobile network 230, and process the network performance data. For example, data acquisition component 420-7 may communicate with data sources 220 and/or mobile network 230 to receive the network performance data. Data acquisition component 420-7 may provide the network performance data to ingest processing component 420-6. Ingest processing component 420-6 may filter and/or parse the network performance data, and may provide the filtered/parsed network performance data to real time performance data processing component 420-4.

Real time performance data processing component 420-4 may process (e.g., in near real time) the network performance data so that the network performance data is provided in a format that can be compared with network configuration data. For example, real time performance data processing component 420-4 may determine key performance indicators (KPIs), geo-location information, threshold information, filtered network events, or the like, based on the network performance data. Real time performance data processing component 420-4 may provide the formatted network performance data to real time information generation component 420-5. Real time information generation component 420-5 may generate (e.g., in near real time) information that is associated with mobile network 230, users or subscribers of mobile network 230, locations of the users, or the like, based on the formatted network performance data. Real time information generation component 420-5 may store the generated information in performance data storage 430, and/or may provide the generated information to state applications component 410.

Performance data storage 430 may include a memory that stores the network performance data, and/or the information that is associated with mobile network 230, users or subscribers of mobile network 230, locations of the users, or the like, generated by real time information generation component 420-5. In some implementations, performance data storage 430 may store the network performance data and/or the information for a short time period (e.g., in hours or days).

Network configuration acquisition component 440 may receive network configuration data (e.g., a number of cells in mobile network 230, a topology of mobile network 230, provisioning of network resources 235, faults and events occurring in mobile network 230, or the like) from data sources 220 and/or mobile network 230. In some implementations, network configuration acquisition component 440 may receive the network configuration data from network resources 235 (e.g., a base station, an OSS, or the like) of mobile network 230, and may store the network configuration data in network configuration storage 450.

Network configuration storage 450 may include a memory that stores the network configuration data received by network configuration acquisition component 440. Network configuration storage 450 may provide the network configuration data to analysis component 460.

Analysis component 460 may include a component that receives the network performance data, the information generated by real time information generation component 420-5, and the network configuration data, and performs one or more analyses based on the received data and information. In some implementations, analysis component 460 may determine an assumed state of mobile network 230 based on the network performance data and the information generated by real time information generation component 420-5, and may determine an actual state or an apparent of mobile network 230 based on the network configuration data. Analysis component 460 may compare the assumed state of mobile network 230 and the actual state of mobile network 230, and may determine mobile network 230 has an issue when the assumed state and the actual state of mobile network 230 do not match. The issue in mobile network 230 may be caused by, for example, configuration errors, ambiguous cell resolution, or the like.

In some implementations, analysis component 460 may identify a desired state of mobile network 230 based on identifying the issue in mobile network 230. For example, analysis component 460 may determine that the desired state of mobile network 230 is the assumed state of mobile network 230 or a state that eliminates the issue. In some implementations, analysis component 460 may cause state applications component 410 and change component 420-1 to implement the desired state of mobile network 230, as described above. In some implementations, analysis component 460 may identify the desired state of mobile network 230 based on an analysis of KPIs, a per-user analysis of the network performance data and the network configuration data, a time-based analysis (e.g., weekly, monthly, or the like) of the network performance data and the network configuration data, or the like. In some implementations, analysis component 460 may implement a change to mobile network 230 based on an initial understanding of the network configuration data, and a result of implementing the change may suggest that an actual state of mobile network 230 is different (e.g., indicating that an error occurred in mobile network 230).

Communication component 470 may permit communication among the components of SON system 210.

The number and arrangement of functional components shown in FIG. 4 are provided as an example. In practice, SON system 210 may include additional functional components, fewer functional components, different functional components, or differently arranged functional components than those shown in FIG. 4. Additionally, or alternatively, a set of functional components (e.g., one or more functional components) of SON system 210 may perform one or more functions described as being performed by another set of functional components of SON system 210. For example, SON system 210 may interact with another SON system 210 associated with one or more other entities and/or mobile networks 230.

FIG. 5 is a flow chart of an example process 500 for automatically optimizing a network configuration state of a mobile network. In some implementations, one or more process blocks of FIG. 5 may be performed by SON system 210. In some implementations, one or more process blocks of FIG. 5 may be performed by another device or a group of devices separate from or including SON system 210, such as, for example, data sources 220.

As shown in FIG. 5, process 500 may include receiving network performance data associated with a mobile network (block 510). For example, SON system 210 may receive network performance data from data sources 220. In some implementations, the network performance data may relate to a throughput associated with mobile network 230, dropped calls received by mobile network 230, a QoS provided by mobile network 230, a bandwidth of mobile network 230, or the like. In some implementations, SON system 210 may receive the network performance data in near real time relative to when the network performance data is generated. In some implementations, data sources 220 may receive (e.g., in near real time) raw network data from probes, measurement instruments, VNFs, third party PMs, or the like, associated with mobile network 230. The raw network data may include packet data, call data, load information, or the like, associated with mobile network 230. In some implementations, data sources 220 may calculate the network performance data based on the raw network data, and may provide the network performance data to SON system 210. For example, data sources 220 may calculate the throughput of mobile network 230 based on the packet data and/or the load information, may calculate dropped calls based on the call data, or the like. In some implementations, a latent demand in mobile network 230 may be calculated based on, for example, an amount of data traffic queued in an uplink and/or a downlink, a measure of admission control performed in the uplink and/or downlink to admit users to SON system 210, a measure of rate management or back-off performed such that an expected increase in traffic that is observed following an improvement in radio conditions may be predicted, or the like.

In some implementations, SON system 210 may receive some or all of the network performance data directly from mobile network 230. In one example, one or more network resources 235 of mobile network 230 may provide the network performance data to SON system 210. In another example, SON system 210 may receive the network performance data from probes, measurement instruments, VNFs, third party PMs, or the like, associated with mobile network 230.

As further shown in FIG. 5, process 500 may include processing the network performance data (block 520). For example, SON system 210 may process the network performance data to generate processed network performance data in near real time relative to when the network performance data is received. In some implementations, SON system 210 may process the network performance data by converting the network performance data into a format that may be compared with network configuration data, by associating geo-location information with the network performance data, or the like. In some implementations, SON system 210 may calculate KPIs based on the network performance data, may associated geo-location information with the network performance data, may identify thresholds associated with the network performance data, or the like. In some implementations, SON system 210 may generate location information associated with mobile network 230, information associated with users or subscribers of mobile network 230, location information of the users, or the like, based on the network performance data.

As further shown in FIG. 5, process 500 may include receiving network configuration data associated with the mobile network (block 530). For example, SON system 210 may receive network configuration data from mobile network 230. In some implementations, SON system 210 may receive some or all the network configuration data from data sources 220. In such implementations, mobile network 230 may provide the network configuration data to data sources 220 for storage. In some implementations, SON system 210 may periodically receive the network configuration data. The network configuration data may include KPIs associated with mobile network 230, a number of cells in mobile network 230, a number of network resources 235 in mobile network

230, a topology of mobile network 230, faults occurring in mobile network 230, or the like.

As further shown in FIG. 5, process 500 may include identifying an issue in the mobile network based on the processed network performance data and the network configuration data (block 540). For example, SON system 210 may identify an issue in mobile network 230 based on the processed network performance data and the network configuration data. In some implementations, SON system 210 may determine an assumed state of mobile network 230 based on the processed network performance data. For example, SON system 210 may utilize the KPIs calculated from the network performance data to determine the assumed state of mobile network 230. SON system 210 may determine an actual state or an apparent state of mobile network 230 based on the network configuration data. For example, SON system 210 may utilize the KPIs calculated from the network configuration data to determine the actual state of mobile network 230. SON system 210 may compare the assumed state of mobile network 230 and the actual state of mobile network 230, and may determine that mobile network 230 has an issue when the assumed state and the actual state of mobile network 230 do not match (e.g., when one or more of the KPIs calculated from the network performance data do not match one or more corresponding KPIs calculated from the network configuration data). The issue in mobile network 230 may indicate that the actual state of mobile network 230 is incorrect (e.g., contains errors or inconsistencies), which may be caused by, for example, configuration errors in mobile network 230, configuration errors in network resources 235, or the like.

In some implementations, the issue in mobile network 230 may include a problem with network parameter (e.g., a timer) of mobile network 230, performance degradation of mobile network 230, a mismatch to a policy of mobile network (e.g., a power setting, an antenna tilt alignment, or the like), or the like. In some implementations, SON system 210 may specify conditions or thresholds to be satisfied before the issue in mobile network 230 is identified.

As further shown in FIG. 5, process 500 may include determining a desired state of the mobile network based on identifying the issue in the mobile network (block 550). For example, SON system 210 may determine a desired state of mobile network 230 based on identifying the issue in mobile network 230. In some implementations, SON system 210 may determine that the desired state of mobile network 230 is the assumed state of mobile network 230 or a state that eliminates the issue. In some implementations, SON system 210 may identify the desired state of mobile network 230 based on an analysis of KPIs, a per-user analysis of the network performance data and the network configuration data, a time-based analysis (e.g., weekly, monthly, or the like) of the network performance data and the network configuration data, or the like.

As further shown in FIG. 5, process 500 may include determining a set of changes to the mobile network to achieve the desired network state (block 560). For example, SON system 210 may determine a set of changes to mobile network 230 to achieve the desired network state of mobile network 230. In some implementations, SON system 210 may determine a set of changes that, when implemented by mobile network 230, resolve the issue in mobile network 230. In some implementations, SON system 210 may determine a set of network parameters to implement in mobile network 230 (e.g., which resolve the issue), such as, for example, transmit power levels for base stations of mobile network 230, neighbor cell relation tables, electrical tilts for antennas of mobile network 230, pointing direction/angles (e.g., elevation and/or azimuth) for the antennas, handover thresholds of mobile network 230, or the like. In some implementations, SON system 210 may determine a set of changes to mobile network 230 (e.g., which resolve the issue), such as changes to functions performed by an OSS of mobile network 230, allocating capacity for network function virtualization and/or data links per a policy provided by a PCRF of mobile network 230, or the like.

As further shown in FIG. 5, process 500 may include causing the mobile network to implement the set of changes and achieve the desired network state (block 570). For example, SON system 210 may cause mobile network 230 to implement the set of changes and achieve the desired network state in near real-time relative to receipt of the network performance data. In some implementations, SON system 210 may provide, to mobile network 230, instructions that cause mobile network 230 to execute the set of changes (e.g., network parameters). The execution of the set of changes by mobile network 230 may change the state of mobile network 230 to the desired state. In some implementations, where mobile network 230 is provided as a NaaS and includes one or more slices of a larger network, SON system 210 may cause mobile network 230 to implement the set of changes and achieve the desired network state within particular network slices.

In some implementations, SON system 210 may send a change (e.g., a network parameter) to a network resource 235, and network resource 235 may receive and implement the change. For example, SON system 210 may instruct a base station of mobile network 230 to increase a power level, may instruct an antenna of mobile network 230 to change an angle of tilt, or the like.

In some implementations, SON system 210 may perform a conflict check before causing mobile network 230 to implement the set of changes. For example, SON system 210 may determine whether the set of changes conflicts with other changes being made to mobile network 230 at a same or similar time and/or geographical location. If SON system 210 determines that the set of changes conflicts with the other changes, SON system 210 may revise the set of changes, reschedule implementation of the set of changes, revise the other changes, reschedule implementation of the other changes, or the like, to prevent the conflicts. In some implementations, SON system 210 may utilize best efforts conflict resolution to resolve conflicts between the set of changes and the other changes.

In some implementations, SON system 210 may identify a pattern of undesirable issues in mobile network 230 based on historical network performance data and historical network configuration data. SON system 210 may prepare a set of changes to mobile network 230 (e.g., actions to take) based on the historical data. This may enable SON system 210 to rapidly respond to the pattern of undesirable issues with the set of changes, and the set of changes may take priority over other conflicting changes to mobile network 230.

As further shown in FIG. 5, process 500 may include updating the network configuration data based on the set of changes (block 580). For example, SON system 210 may update the network configuration data based on the set of changes implemented by mobile network 230. In some implementations, SON system 210 may update the network configuration data, stored in network configuration storage 450 of SON system 210, with the set of changes implemented by mobile network 230.

In some implementations, SON system 210 may receive subscriber records for multiple mobile devices associated with mobile network 230, and may receive performance data associated with mobile network 230 in near real time. The performance data may include one or more of performance management statistics, call trace data associated with the subscriber records, and geolocated subscriber records for the multiple mobile devices associated with mobile network 230. SON system 210 may store the geolocated subscriber records with other types of data in an asynchronous manner, and may receive configuration data associated with mobile network 230. The configuration data may indicate a topology of mobile network 230. SON system 210 may identify, based on at least one of the topology and the performance data, a desired topology of mobile network 230. In some implementations, the desired topology may be predicted to achieve at least one of improved network performance or alignment with a network design policy of mobile network 230. In some implementations, SON system 10 may identify, based on at least one of the performance data and the configuration data, an inferred topology of the mobile network. The inferred topology may be different than the topology of mobile network 230.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6A:
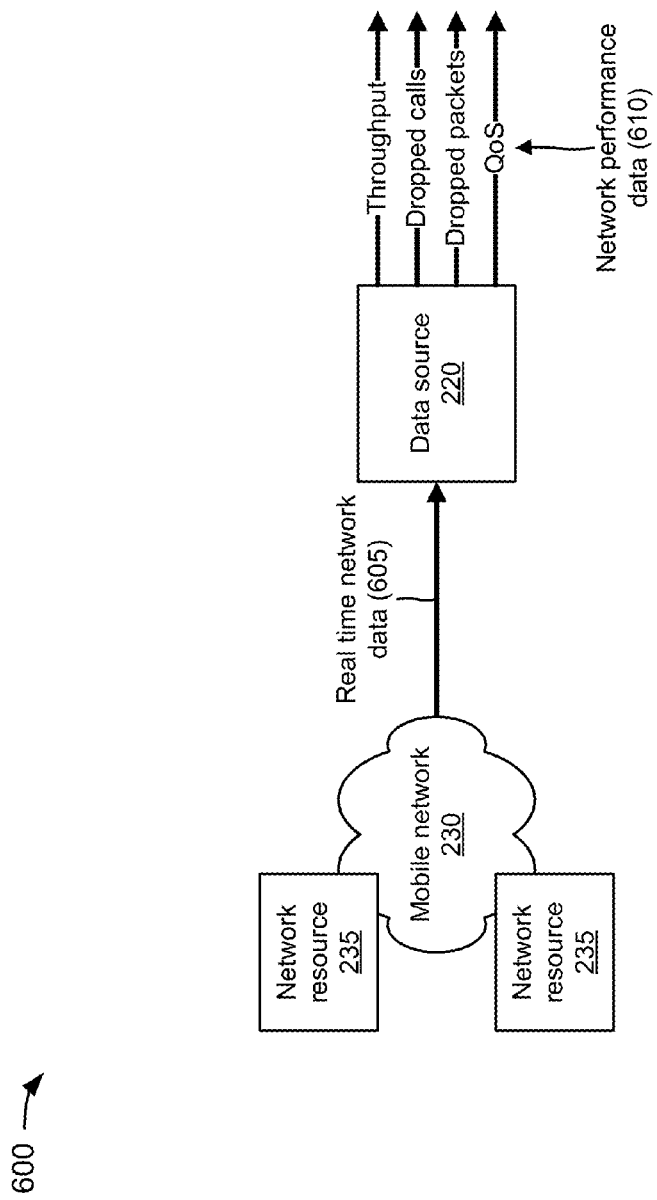
FIGS. 6A-6D are diagrams of an example relating to the example process shown in FIG. 5.

FIGS. 6A-6D are diagrams of an example 600 relating to example process 500 shown in FIG. 5. As shown in FIG. 6A, mobile network 230 and/or network resources 235 may provide real time network data 605 to data source 220, and data source 220 may receive real time network data 605. Real time network data 605 may include packet data, call data, load information, or the like, associated with mobile network 230 and/or network resources 235. Data source 220 may determine network performance data 610 based on real time network data 605. For example, data source 220 may calculate a throughput of mobile network 230, a number of dropped calls by mobile network 230, a number of dropped packets by mobile network 230, a QoS of mobile network 230, a latent demand of mobile network 230, or the like, based on an analysis of real time network data 605. The throughput, the number of dropped calls, the number of dropped packets, and the QoS may correspond to network performance data 610.

Figure 6B:
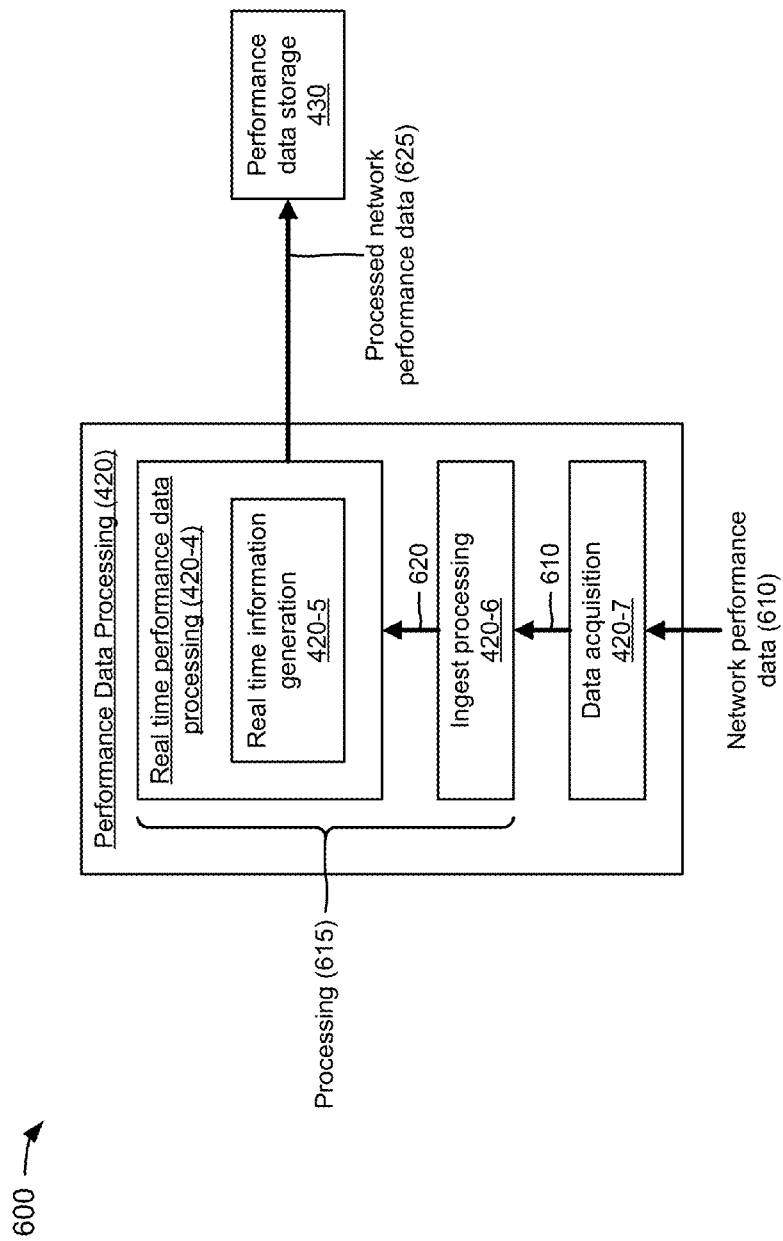

As shown in FIG. 6B, data source 220 may provide network performance data 610 to performance data processing component 420 of SON system 210. Data acquisition component 420-7, of performance data processing component 420, may receive network performance data 610, and may provide network performance data 610 to ingest processing component 420-6. As indicated by reference number 615 in FIG. 6B, ingest processing component 420-6, real time performance data processing component 420-4, and real time information generation component 420-5 may perform processing of network performance data 610. Ingest processing component 420-6 may filter and/or parse network performance data 610, and may provide filtered/parsed network performance data 620 to real time performance data processing component 420-4.

Real time performance data processing component 420-4 may process filtered/parsed network performance data 620 so that filtered/parsed network performance data 620 is provided in a format that can be compared with network configuration data. Real time information generation component 420-5 may generate information that is associated with mobile network 230, users or subscribers of mobile network 230, locations of the users, or the like, based on the formatted network performance data 610. Real time performance data processing component 420-4 may store processed network performance data 610 in performance data storage 430, as indicated by reference number 625.

Figure 6C:
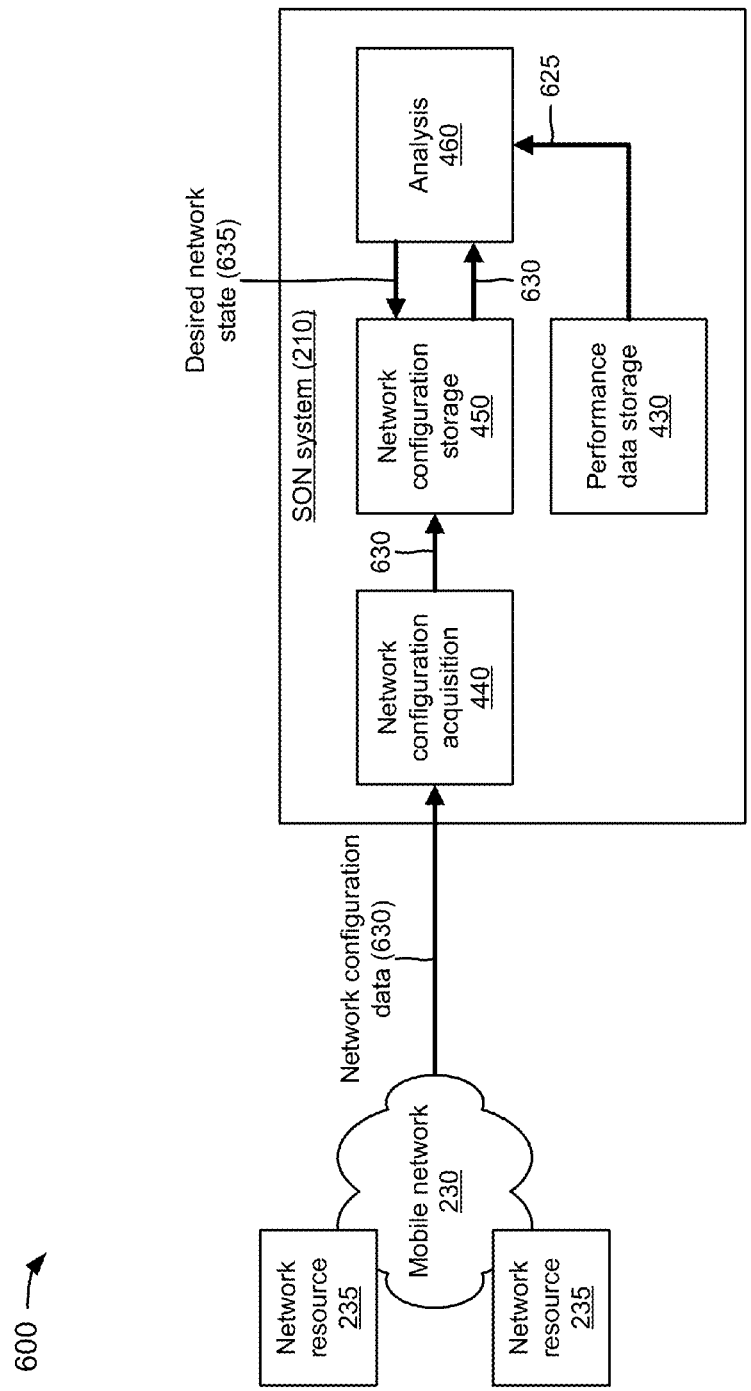

As shown in FIG. 6C, mobile network 230 and/or network resources 235 may provide network configuration data 630 to SON system 210, and network configuration acquisition component 440 of SON system 210 may receive network configuration data 630. Network configuration data 630 may include a number of cells in mobile network 230, a number of network resources 235 in mobile network 230, a topology of mobile network 230 and/or network resources 235, provisioning of network resources 235, faults and events occurring in mobile network 230, or the like.

As further shown in FIG. 6C, network configuration acquisition component 440 may store network configuration data 630 in network configuration storage 450. Performance data storage 430 may provide processed network performance data 625 to analysis component 460, and network configuration storage 450 may provide network configuration data 630 to analysis component 460. Analysis component 460 may determine an assumed state of mobile network 230 based on processed network performance data 625, and may determine an actual state of mobile network 230 based on network configuration data 630. Analysis component 460 may compare the assumed state of mobile network 230 and the actual state of mobile network 230, and may determine that mobile network 230 has an issue when the assumed state and the actual state of mobile network 230 do not match. Analysis component 460 may identify a desired state 635 of mobile network 230 based on the determined issue in mobile network 230, and may provide desired state 635 of mobile network 230 to network configuration storage 450.

Figure 6D:
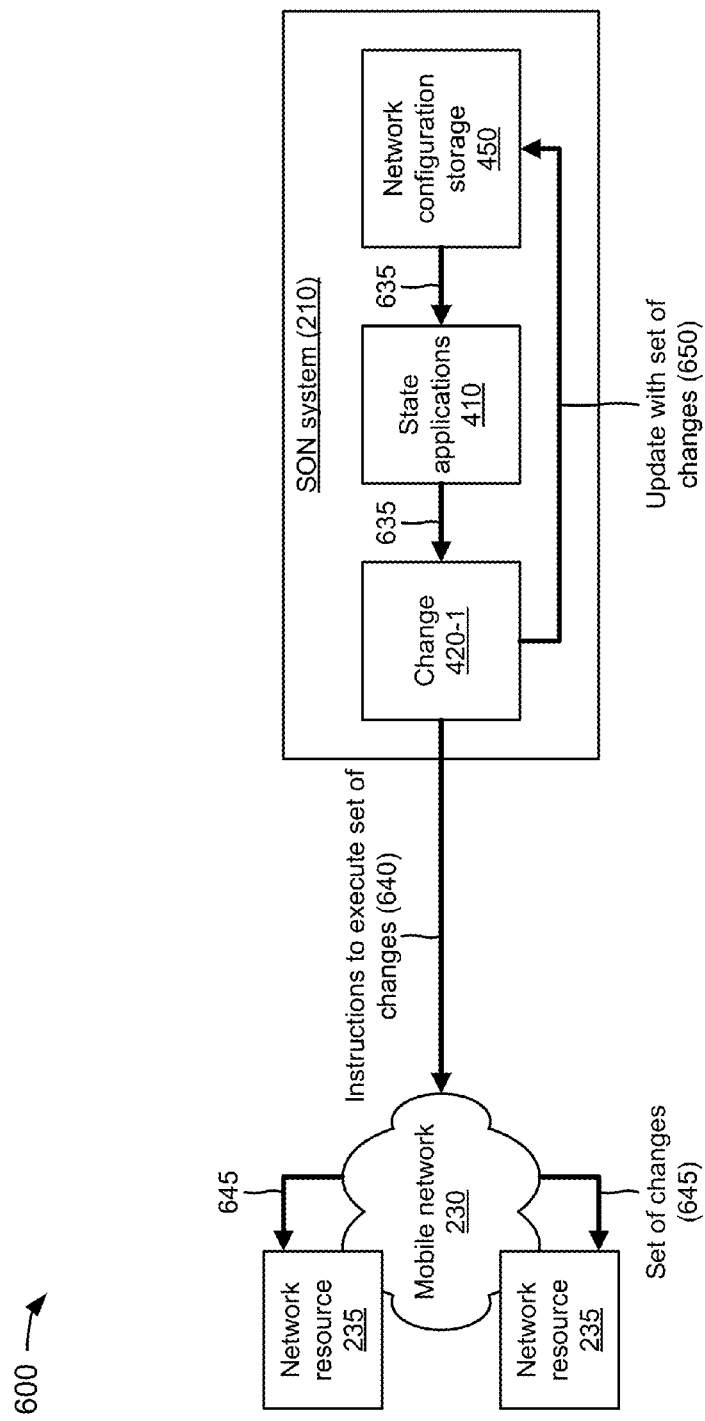

As shown in FIG. 6D, network configuration storage 450 may provide desired state 635 of mobile network 230 to state applications component 410. State applications component 410 may trigger implementation of desired state 635 of mobile network 230, by providing desired state 635 of mobile network 230 to change component 420-1. Change component 420-1 may generate a set of changes (e.g., to network parameters) that cause mobile network 230 to achieve desired state 635 and resolve the issue in mobile network 230. Change component 420-1 may generate instructions 640 that instruct mobile network 230 to execute the set of changes, and may provide instructions 640 and the set of changes to mobile network 230. Mobile network 230 may execute the set of changes on network resources 235 to resolve the issue, as indicated by reference number 645. Change component 420-1 may update network configuration data 630, provided in network configuration storage 450, with the set of changes, as indicated by reference number 650.

As indicated above, FIGS. 6A-6D are provided merely as an example. Other examples are possible and may differ from what was described with regard to FIGS. 6A-6D. In some implementations, the various operations described in connection with FIGS. 6A-6D may be performed automatically or at the request of a user.

Figure 7:
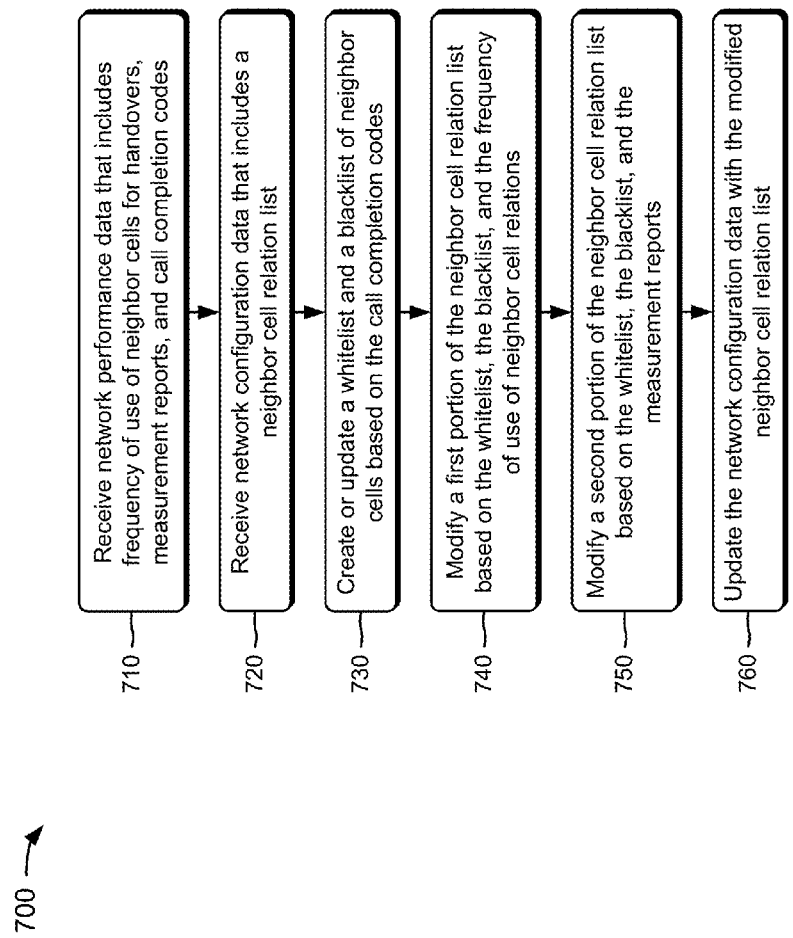
FIG. 7 is a flow chart of an example process for automatically creating a neighbor cell relation list based on a network configuration state of a mobile network.

FIG. 7 is a flow chart of an example process 700 for automatically creating a neighbor cell relation list based on a network configuration state of a mobile network. In some implementations, one or more process blocks of FIG. 7 may be performed by SON system 210. In some implementations, one or more process blocks of FIG. 7 may be performed by another device or a group of devices separate from or including SON system 210, such as, for example, data sources 220.

As shown in FIG. 7, process 700 may include receiving network performance data that includes frequency of use of neighbor cells for handovers, measurement reports, and call completion codes (block 710). For example, SON system 210 may receive network performance data from data sources 220. In some implementations, the network performance data may include a frequency of use of neighbor cells for handovers by mobile network 230, measurement reports (e.g., reports, provided by mobile communication devices to mobile network 230, that include measurements of the neighbor cells, measurements of block error rates, measurements of transmit powers, or the like), and call completion codes (e.g., completed, hung up, no answer, busy, unobtainable, dropped, or failed).

In some implementations, SON system 210 may receive the network performance data in near real time relative to generation of the network performance data. In some implementations, data sources 220 may receive (e.g., in near real time) raw network data from probes, measurement instruments, VNFs, third party PMs, network slices, or the like, associated with mobile network 230. The raw network data may include packet data, call data, load information, or the like, associated with mobile network 230. In some implementations, data sources 220 may determine the network performance data based on the raw network data, and may provide the network performance data to SON system 210.

In some implementations, SON system 210 may receive the network performance data directly from mobile network 230. In one example, one or more network resources 235 of mobile network 230 may provide the network performance data to SON system 210. In another example, SON system 210 may receive the network performance data from probes, measurement instruments, VNFs, third party PMs, or the like, associated with mobile network 230.

As further shown in FIG. 7, process 700 may include receiving network configuration data that includes a neighbor cell relation list (block 720). For example, SON system 210 may receive network configuration data from mobile network 230. In some implementations, SON system 210 may receive the network configuration data from data sources 220. In such implementations, mobile network 230 may provide the network configuration data to data sources 220 for storage. In some implementations, SON system 210 may periodically receive the network configuration data, may receive the network configuration data in real time, may receive the network configuration data in near real time, or the like. In some implementations, the network configuration data may include a neighbor cell relation list for mobile network 230. The neighbor cell relation list may include a list or a table of neighbor cells to which mobile network 230 may perform a handover of mobile communication devices.

As further shown in FIG. 7, process 700 may include creating or updating a whitelist and a blacklist of neighbor cells based on the call completion codes (block 730). For example, SON system 210 may create or update a whitelist and a blacklist of neighbor cells based on the call completion codes. In some implementations, the whitelist may include a list of neighbor cells that are not to be removed from the neighbor cell relation list. In some implementations, the blacklist may include a list of neighbor cells that are not to be added to the neighbor cell relation list. In some implementations, SON system 210 may create or update the whitelist and the blacklist of neighbor cells based on a rule or the call completion codes. For example, SON system 210 may add information associated with a neighbor cell to the whitelist if mobile network 230 utilizes a rule to include neighbor cells with a certain relationship to a cell of mobile network 230 (e.g., where the relationship may include co-sited cells, co-footprint cells, cells that share a specific group of cell identities, or the like). In another example, SON system 210 may add information associated with a neighbor cell to the whitelist if the neighbor cell is associated with a dropped call due to a missing neighbor cell. In still another example, SON system 210 may add information associated with a neighbor cell to the blacklist if the neighbor cell is associated with an unobtainable call. In still another example, SON system 210 may add information associated with a neighbor cell to the blacklist if the neighbor cell is associated with poor utilization of a relationship when compared with an absolute threshold or a threshold as a percentage of a handover activity for a cell. Once added to the blacklist for such a reason, the membership of the neighbor cell in the blacklist may expire after a period of time and the neighbor cell relationship may be retried to see if the neighbor cell relationship has become more useful.

As further shown in FIG. 7, process 700 may include modifying a first portion of the neighbor cell relation list based on the whitelist, the blacklist, and the frequency of use of neighbor cells for handovers (block 740). For example, SON system 210 may modify or create a first portion of the neighbor cell relation list based on the whitelist, the blacklist, and/or the frequency of use of neighbor cells for handovers by mobile network 230. In some implementations, the frequency of use of neighbor cells for handovers may include a number of neighbor cell add attempts measured on each frequency of mobile network 230.

In some implementations, SON system 210 may add or delete information associated with a neighbor cell to or from the first portion of the neighbor cell relation list based on a comparison of the frequency of use of neighbor cells for handovers by mobile network 230 and a particular threshold (e.g., a fixed threshold, a relative threshold, or the like). For example, if the frequency of use of neighbor cells for handovers by mobile network 230 satisfies the threshold, SON system 210 may add information associated with the neighbor cell to the first portion of the neighbor cell relation the list. In another example, if the frequency of use of neighbor cells for handovers by mobile network 230 does not satisfy the threshold, SON system 210 may delete information associated with a neighbor cell from the first portion of the neighbor cell relation the list. In some implementations, if SON system 210 determines that information associated with a neighbor cell is to be added to the first portion of the neighbor cell relation the list, SON system 210 may analyze the whitelist and the blacklist to determine whether to add the information associated with the neighbor cell. For example, if the neighbor cell is on the whitelist, the information associated with the neighbor cell may be added to the first portion of the neighbor cell relation the list. If the neighbor cell is on the blacklist, the information associated with the neighbor cell may not be added to the first portion of the neighbor cell relation the list.

As further shown in FIG. 7, process 700 may include modifying a second portion of the neighbor cell relation list based on the whitelist, the blacklist, and the measurement reports (block 750). For example, SON system 210 may modify or create a second portion of the neighbor cell relation list based on the whitelist, the blacklist, and/or the measurement reports. In some implementations, SON system 210 may determine a set of measurement reports with a cell that does not include a measurement for a neighbor cell in the neighbor cell relation list, and may determine a set of neighbor cell candidates that are provided in a greatest number in the set of measurement reports. SON system 210 may add the neighbor cell candidates to the second portion of the neighbor cell relation list. SON system 210 may repeat this procedure until all of the measurement reports are checked or until a particular number of neighbor cell candidates are added to the second portion of the neighbor cell relation list. In some implementations, if SON system 210 determines that information associated with a neighbor cell is to be added to the second portion of the neighbor cell relation the list, SON system 210 may analyze the whitelist and the blacklist to determine whether to add the information associated with the neighbor cell. For example, if the neighbor cell is on the whitelist, the information associated with the neighbor cell may be added to the second portion of the neighbor cell relation the list. If the neighbor cell is on the blacklist, the information associated with the neighbor cell may not be added to the second portion of the neighbor cell relation the list.

In some implementations, communication systems may provide some elements of SON system 210 directly into network elements. For example, 4G systems may enable mobile communication devices to: uniquely identify unknown cells at the request of a network; establish X2 communication links between cells; exchange neighbor relationship information between base stations over the X2 communication links; outline a conceptual architecture for establishing and managing neighbor relationships in an autonomous fashion using the information gathered and exchanged between the base stations; or the like.

As further shown in FIG. 7, process 700 may include updating the network configuration data with the modified neighbor cell relation list (block 760). For example, SON system 210 may update the network configuration data based on the modified neighbor cell relation list. In some implementations, SON system 210 may update the network configuration data, stored in network configuration storage 450 of SON system 210, with the modified neighbor cell relation list. In some implementations, SON system 210 may update the network configuration data with the whitelist, the blacklist, and/or the modified neighbor cell relation list.

In some implementations, SON system 210 may determine relationships with neighbor cells utilizing different frequencies, different radio access technologies (RATs), or the like. In such implementations, SON system 210 may determine a set of relationships for an intra-frequency, and may determine that the neighbor cells are co-footprint cells. SON system 210 may determine rules that restrict a direction of handover and a number of handover candidates, and may translate the intra-frequency set of relations into an inter-frequency and/or inter-RAT set of relations that are subject to the determined rules. In some implementations, SON system 210 may determine that two neighbor cells are co-footprint cells based on a determination that latitudes, longitudes, and azimuths of the two neighbor cells are similar within a particular threshold; a determination of a footprint of each cell and determination that an overlap of the footprints between the two cells is greater than a threshold; or a determination that the footprint of one cell is contained within the footprint of the other cell.

In some implementations, SON system 210 may modify or create the first portion of the neighbor cell relation list by selecting neighbor cells based on usage of the neighbor cells by mobile network 230 for handovers, and may modify or create the second portion of the neighbor cell relation list by selecting neighbor cells based on neighbor cells being identified in the measurement reports.

In some implementations, SON system 210 may classify neighbor cells in a first class based on the frequency of use of neighbor cells for handovers by mobile network 230; may classify neighbor cells in a second class based on the measurement reports; and may classify neighbor cells that are infrequently used for handovers in a third class. In some implementations, the first class of neighbor cells may be frequently used by mobile network 230 for performing handovers of mobile communication devices; the second class of neighbor cells may be less frequently used by mobile network 230 for performing handovers of mobile communication devices than the first class of neighbor cells; and the third class of neighbor cells may be less frequently used by mobile network 230 for performing handovers of mobile communication devices than the second class of neighbor cells. In some implementations, SON system 210 may utilize the frequency of use of neighbor cells for handovers by mobile network 230 to identify the first class of neighbor cells; may utilize the measurement reports to identify the second class of neighbor cells; and may utilize network configuration data and/or dropped call completion codes to identify the third class of neighbor cells. In some implementations, SON system 210 may allocate the first class of neighbor cells to the first portion of neighbor cell relation list; may allocate the second class of neighbor cells to the second portion of neighbor cell relation list; and may allocate the third class of neighbor cells to the first portion or the second portion of the neighbor cell relation list.

In some implementations, SON system 210 may provide the neighbor cell relation list to a network resource 235 (e.g., a base station) of mobile network 230 for utilization when making handover decisions to neighbor cells.

In some implementations, SON system 210 may receive performance data associated with mobile network 230 in near real time. The performance data may include frequency of use information identifying a frequency of use of neighbor cells for handovers by mobile network 230, a success of a neighbor cell relationship, release causes for calls associated with mobile network 230, subscriber records for multiple mobile devices associated with mobile network 230, geolocated subscriber records for the multiple mobile devices associated with mobile network 230, or the like. SON system 210 may receive configuration data associated with mobile network 230, and the configuration data may indicate a topology of mobile network 230. SON system 210 may identify, based on at least one of the topology and the performance data, a desired topology of mobile network 230. In some implementations, the desired topology may be predicted to achieve at least one of improved network performance or alignment with a network design policy for mobile network 230.

In some implementations, the desired topology may include a neighbor cell relation list and a parameter set. The neighbor cell relation list may be divided into two or more different portions and different methods may be used to construct the different portions. For example, a first portion of the neighbor cell relation list may include information associated with neighbor cells that are expected to be used frequently, and may be based on one or more of the frequency of use information and a degree of overlap between the neighbor cells. A second portion of the neighbor cell relationship list may be based on an analysis of the subscriber records for the multiple mobile devices. A third portion of the neighbor cell relation list may be based on an analysis of the release causes for calls associated with mobile network 230, and may include information identifying neighbor cells that prevent degradation of mobile network 230 due to dropped calls. A fourth portion of the neighbor cell relationship list may include information associated with inter-frequency or inter-radio access technology neighbor cells, and may be based on an analysis of the geolocated subscriber records for the multiple mobile devices.

Although FIG. 7 shows example blocks of process 700, in some implementations, process 700 may include additional blocks, fewer blocks, different blocks, or differently arranged blocks than those depicted in FIG. 7. Additionally, or alternatively, two or more of the blocks of process 700 may be performed in parallel.

Figure 8A:
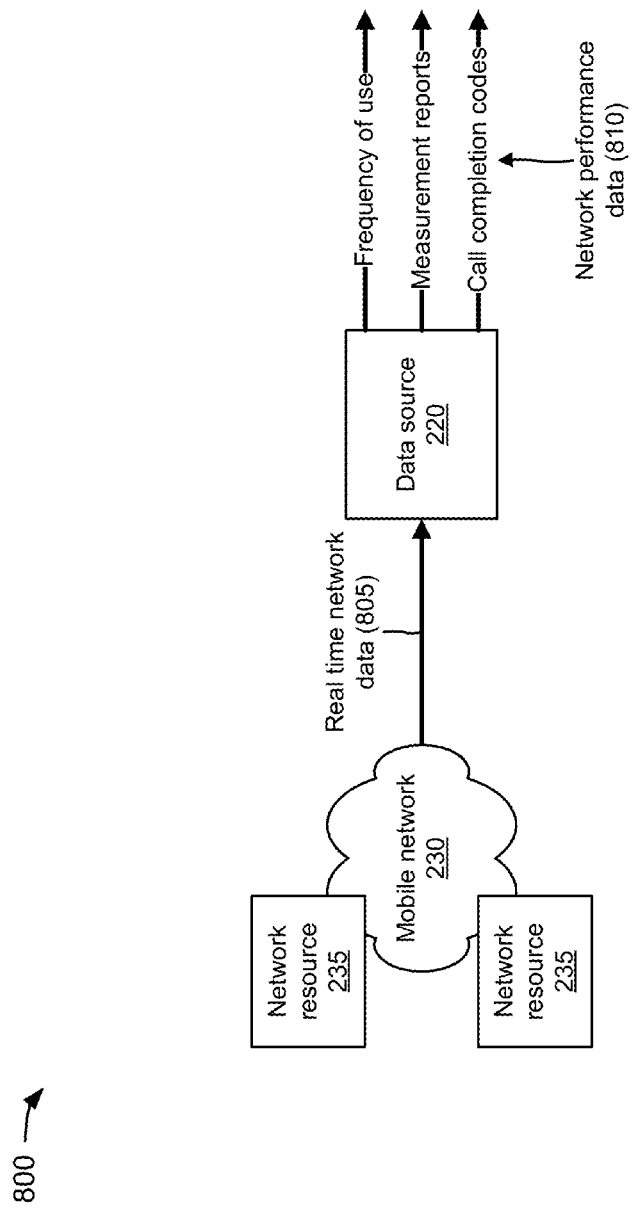

FIGS. 8A-8F are diagrams of an example 800 relating to example process 700 shown in FIG. 7. As shown in FIG. 8A, mobile network 230 and/or network resources 235 may provide real time network data 805 to data source 220, and data source 220 may receive real time network data 805. Real time network data 805 may include packet data, call data, load information, or the like, associated with mobile network 230 and/or network resources 235. Data source 220 may determine network performance data 810 based on real time network data 805. For example, data source 220 may calculate a frequency of use of neighbor cells for handovers by mobile network 230, measurement reports, and call completion codes based on an analysis of real time network data 805. The frequency of use of neighbor cells for handovers by mobile network 230, the measurement reports, and the call completion codes may correspond to network performance data 810.

Figure 8B:
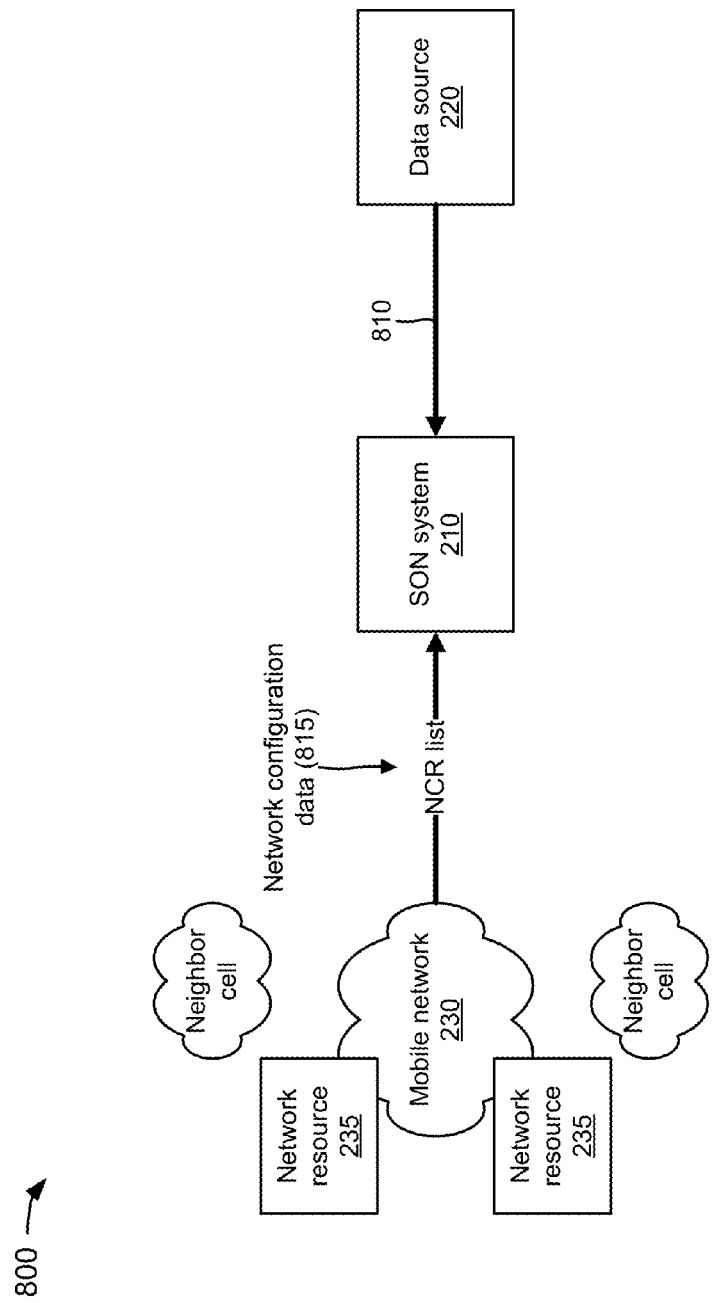

As shown in FIG. 8B, mobile network 230 may be associated with multiple neighbor cells to which mobile network 230 may perform a handover of mobile communication devices. Data source 220 may provide network performance data 810 to SON system 210, and SON system 210 may receive network performance data 810. As further shown in FIG. 8B, mobile network 230 and/or network resources 235 may provide network configuration data 815 to SON system 210, and SON system 210 may receive network configuration data 815. Network configuration data 815 may include a neighbor cell relation (NCR) list and other information (e.g., a topology of mobile network 230, a bandwidth of mobile network 230, or the like).

As shown in FIG. 8C, SON system 210 may utilize information from the neighbor cell relation list (e.g., provided in network configuration data 815), such as a target cell identifier (TCI) column 820, to create a whitelist 825 and a blacklist 830 of neighbor cells based on a rule or the call completion codes provided in network performance data 810. Each TCI 820 may identify a target neighbor cell of mobile network 230, and may correspond to a cell global identifier (CGI) and a physical cell identifier (PCI) of the target neighbor cell. Whitelist 825 may include a list of neighbor cells of mobile network 230 that are not to be removed from the neighbor cell relation list. For example, whitelist 825 may indicate that information identifying neighbor cells associated with TCI #2, TCI #3, and TCI #4 are not to be removed from the neighbor cell relation list. Blacklist 830 may include a list of neighbor cells of mobile network 230 that are not to be added to the neighbor cell relation list. For example, blacklist 830 may indicate that information identifying a neighbor cell associated with TCI #1 is not to be added to the neighbor cell relation list.

As shown in FIG. 8D, SON system 210 may modify or create a neighbor cell relation list 835 based on whitelist 825, blacklist 830, the frequency of use of neighbor cells for handovers by mobile network 230, and/or the measurement reports. Neighbor cell relation list 835 may include TCI column 820, a neighbor cell relation column 840, an attributes column 845, and multiple entries associated with each column. Each entry of neighbor cell relation column 840 may provide an identifier for a relation between mobile network 230 and a corresponding target neighbor cell identified in TCI column 820. Each entry of attributes column 845 may indicate attributes (e.g., based on the measurement reports or the frequency of use of neighbor cells for handovers) associated with mobile network 230 and a corresponding target neighbor cell identified in TCI column 820.

As further shown in FIG. 8D, SON system 210 may modify or create a first portion 850 of neighbor cell relation list 835 based on whitelist 825, blacklist 830, and/or the frequency of use of neighbor cells for handovers by mobile network 230. For example, SON system 210 may add entries associated with particular neighbor cells (e.g., TCI #2, TCI #3, and TCI #4) to first portion 850 of neighbor cell relation list 835 since the particular neighbor cells are provided in whitelist 825. SON system 210 may modify or create a second portion 855 of neighbor cell relation list 835 based on whitelist 825, blacklist 830, and/or the measurement reports. For example, SON system 210 may add entries associated with particular neighbor cells (e.g., TCI #5, TCI #7, TCI #9, and TCI #10) to second portion 855 of neighbor cell relation list 835 since the particular neighbor cells are provided in the measurement reports.

Figure 8E:
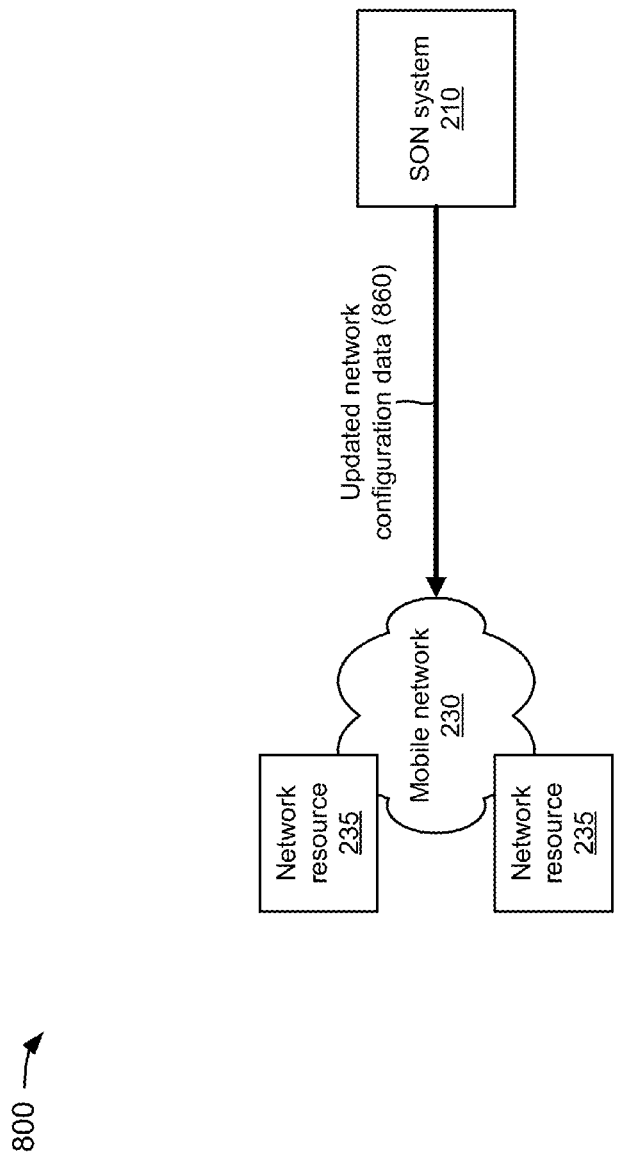

SON system 210 may update network configuration data 815 based on neighbor cell relation list 835 (e.g., by replacing a current neighbor cell relation list with neighbor cell relation list 835), and may store the updated network configuration data 815. As shown in FIG. 8E, SON system 210 may provide the updated network configuration data 815 to mobile network 230, and indicated by reference number 860. Mobile network 230 and/or network resources 235 may implement any changes (e.g., to network parameters) associated with the updated network configuration data 815. For example, SON system 210 may provide neighbor cell relation list 835 to a network resource 235 (e.g., a base station) of mobile network 230 for utilization when making handover decisions to neighbor cells.

Figure 8F:
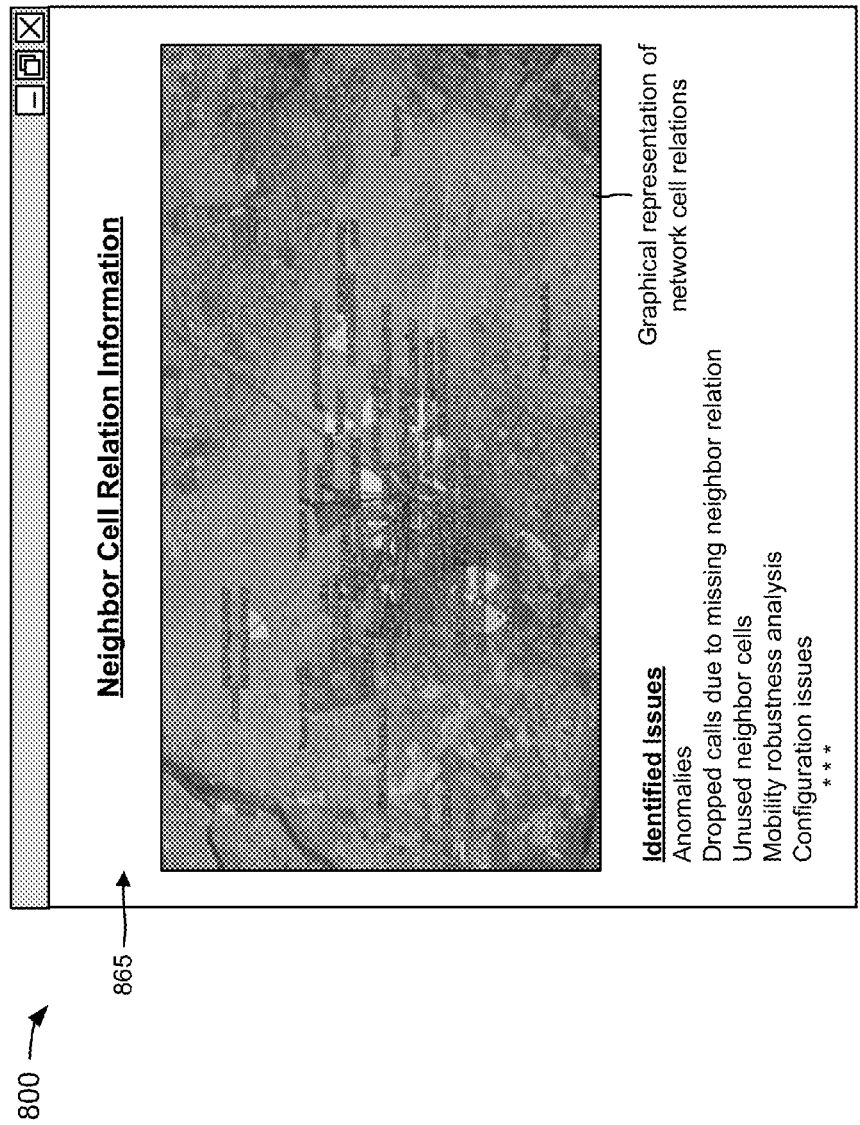

As shown in FIG. 8F, SON system 210 may generate and provide for display a user interface 865 associated with network cell relation list 835. User interface 865 may include a variety of information associated with neighbor cell relations of mobile network 230. For example, user interface 865 may include a graphical representation of network cell relations of mobile network 230. User interface 865 may include issues identified during determination of network cell relation list 835, such as anomalies, dropped calls, unused neighbor cells, mobility robustness, configuration issues, or the like.

In some implementations, SON system 210 may enable manual selection of neighbor cells for neighbor cell relation list 835, or may enable automatic selection (e.g., based on a threshold, a KPI trigger, a configuration failure, or the like) of neighbor cells for neighbor cell relation list 835. SON system 210 may enable manual or automatic determination of a time period associated creation of neighbor cell relation list 835. SON system 210 may implement an automatic neighbor relation (ANR) functionality to create neighbor cell relation list 835 when instructed by a user of SON system 210 or automatically based on network triggers (e.g., implement the ANR functionality on poorly performing cells during a maintenance period).

In some implementations, user interface 865 may highlight different neighbor cell problems to enable quick identification of different severity levels of problems. User interface 865 may include recommended solutions to the problems and/or an action plan for implementing the solutions. For example, user interface 865 may include information identifying anomalies associated with neighbor cells; dropped calls due to an omitted neighbor cell relationship; unused neighbor cells; mobility robustness analysis outputs; configuration issues with mobile network 230 (e.g., errors in network configuration data 815); PCI misidentification; measurement report footprint analysis; coverage analyses; pruning of neighbor cell relation list 835 to align with a network policy; a comparison with ANR functionality outputs; or the like.

In some implementations, SON system 210 may automatically correct neighbor cell relation issues based on previous ANR results. For example, if a neighbor cell relation is added and deleted from neighbor cell relation list 835 repeatedly, SON system 210 may adjust a threshold to prevent the neighbor cell from being added to neighbor cell relation list 835. In some implementations, SON system 210 may monitor performance of previous ANR results. For example, if a new neighbor cell is added to neighbor cell relation list 835, SON system 210 may determine whether and how successfully the new neighbor cell is used by mobile network 230. In some implementations, SON system 210 may provide for display (e.g., via user interface 865) information identifying neighbor cell relation issues, information identifying actions to take to correct the neighbor cell relation issues, and information identifying results of the actions taken.

As indicated above, FIGS. 8A-8F are provided merely as an example. Other examples are possible and may differ from what was described with regard to FIGS. 8A-8F. In some implementations, the various operations described in connection with FIGS. 8A-8F may be performed automatically or at the request of a user.

Systems and/or methods, described herein, may provide a SON system that performs optimization of a mobile network, such as a cellular network, and that generates an optimized neighbor cell relation list for a cell in a mobile network, such as a cellular network. The systems and/or methods may determine, analyze, and quickly implement changes to network parameters in a mobile network using the SON system. With the increased speeds associated with implementing the changes in near real-time, the entire mobile network may not need to be disabled for the changes to be implemented.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, or the like). The user interfaces may receive user inputs via one or more input devices, may be user-configurable (e.g., a user may change the sizes of the user interfaces, information displayed in the user interfaces, color schemes used by the user interfaces, positions of text, images, icons, windows, or the like, in the user interfaces, or the like). Information associated with the user interfaces may be selected and/or manipulated by a user (e.g., via a touch screen display, a mouse, a keyboard, a keypad, voice commands, or the like). In some implementations, information provided by the user interfaces may include textual information and/or an audible form of the textual information.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related items and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method for automated neighbor relation determination, comprising:

receiving, by a device, performance data associated with a mobile network in near real time,
the performance data including one or more of:
frequency of use information identifying a frequency of use of neighbor cells for handovers by the mobile network,
a success associated with a neighbor cell relationship,
release causes for calls associated with the mobile network,
subscriber records for a plurality of mobile devices associated with the mobile network, or
geolocated subscriber records for the plurality of mobile devices associated with the mobile network;
receiving, by the device, configuration data associated with the mobile network,
the configuration data indicating a topology of the mobile network; and
identifying, by the device and based on at least one of the topology or the performance data, a desired topology of the mobile network,
the desired topology being predicted to achieve at least one of improved network performance or alignment with a network design policy,
the desired topology including a neighbor cell relation list and a parameter set,
the neighbor cell relation list being divided into two or more different portions and different methods being used to construct the different portions,
a first portion of the neighbor cell relation list including information associated with neighbor cells that are expected to be used frequently, and being based on one or more of the frequency of use information or a degree of overlap between the neighbor cells, and
a second portion of the neighbor cell relation list being based on an analysis of the subscriber records for the plurality of mobile devices.

2. The method of claim 1, further comprising:
identifying, based on at least one of the performance data or the configuration data, an inferred topology of the mobile network,
the inferred topology being different than the topology of the mobile network.

3. The method of claim 1, where:
a third portion of the neighbor cell relation list is based on an analysis of the release causes for calls associated with the mobile network, and includes information identifying neighbor cells that prevent degradation of the mobile network due to dropped calls, and
a fourth portion of the neighbor cell relation list includes information associated with inter-frequency or inter-radio access technology neighbor cells, and is based on an analysis of the geolocated subscriber records for the plurality of mobile devices.

4. The method of claim 1,
where the performance data includes call completion codes, and
where the method further comprises:
updating a whitelist of neighbor cells and a blacklist of neighbor cells based on the call completion codes,
the whitelist of neighbor cells including a list of neighbor cells that are not to be removed from the neighbor cell relation list, and
the blacklist of neighbor cells including a list of neighbor cells that are not to be added to the neighbor cell relation list.

5. The method of claim 1,
where the frequency of use information includes a number of attempts to add the neighbor cells to the neighbor cell relation list, and
where the method further comprises:
determining whether the frequency of use information, associated with neighbor cells, satisfies a threshold; and
including the information associated with the neighbor cells in the first portion of the neighbor cell relation list when the frequency of use information, associated with the neighbor cells, satisfies the threshold.

6. The method of claim 1, further comprising:
determining a set of measurement reports with information identifying neighbor cells that are not included in the neighbor cell relation list;
identifying neighbor cell candidates that are provided in a greatest number in the set of measurement reports; and
including information identifying the neighbor cell candidates in the second portion of the neighbor cell relation list.

7. The method of claim 1, where the first portion and the second portion of the neighbor cell relation list include information identifying neighbor cells with different radio frequencies or different radio access technologies.

8. The method of claim 1, further comprising:
generating a user interface than includes information associated with the first portion and the second portion of the neighbor cell relation list; and
providing the user interface for display.

9. A method, comprising:
receiving, by a device, performance data associated with a mobile network in near real time,
the performance data including one or more of:
performance management statistics,
call trace data associated with subscriber records for a plurality of mobile devices associated with the mobile network, or
geolocated subscriber records for the plurality of mobile devices associated with the mobile network;
receiving, by the device, configuration data associated with the mobile network,
the configuration data indicating a topology of the mobile network;
determining, by the device, an assumed state of the mobile network based on the performance data;
determining, by the device, an apparent state of the mobile network based on the configuration data; and
identifying, by the device, an issue in the mobile network based on the assumed state of the mobile network and the apparent state of the mobile network.

10. The method of claim 9, further comprising:
identifying, based on at least one of the performance data or the configuration data, an inferred topology of the mobile network,
the inferred topology being different than the topology of the mobile network.

11. The method of claim 9, where the performance data further includes one or more of:
a throughput associated with the mobile network,
dropped calls associated with the mobile network, or
a quality of service (QoS) associated with the mobile network.

12. The method of claim 9, further comprising:
determining one or more changes to the mobile network to correct the issue in the mobile network; and
causing, by the device, the mobile network to implement the one or more changes in order to correct the issue in the mobile network.

13. The method of claim 12, further comprising:
updating the configuration data based on the one or more changes; and
storing the updated configuration data.

14. The method of claim 12, where identifying the issue in the mobile network comprises:
comparing the assumed state of the mobile network and the apparent state of the mobile network; and
identifying the issue in the mobile network when the assumed state of the mobile network and the apparent state of the mobile network do not match.

15. The method of claim 12, where the one or more changes to the mobile network include one or more network parameters to be implemented by the mobile network.

16. The method of claim 12, where the issue includes at least one of:
a timer problem associated with the mobile network,
a performance degradation of the mobile network, or
a mismatch with a policy associated with the mobile network.

17. The method of claim 12, further comprising:
determining that the one or more changes to the mobile network cause a conflict with other changes to the mobile network; and
revising the one or more changes or rescheduling implementation of the one or more changes to prevent the conflict with the other changes to the mobile network.

18. A device, comprising:
a memory; and
one or more processors configured to:
receive performance data associated with a mobile network in near real time,
the performance data including one or more of:
performance management statistics, call trace data associated with subscriber records for a plurality of mobile devices associated with the mobile network, or geolocated subscriber records for the plurality of mobile devices associated with the mobile network;

receive configuration data associated with the mobile network, the configuration data indicating a topology of the mobile network;

determine an assumed state of the mobile network based on the performance data;

determine an apparent state of the mobile network based on the configuration data; and identify, an issue in the mobile network based on the assumed state of the mobile network and the apparent state of the mobile network.

19. The device of claim 18, where the one or more processors are further configured to:

identify, based on at least one of the performance data and the configuration data, an inferred topology of the mobile network, the inferred topology being different than the topology of the mobile network.

20. The device of claim 18, where the performance data further includes one or more of:

a throughput associated with the mobile network, dropped calls associated with the mobile network, or a quality of service (QoS) associated with the mobile network.

\* \* \* \* \*